US010275198B2

(12) United States Patent
Nobutani et al.

(10) Patent No.: US 10,275,198 B2
(45) Date of Patent: Apr. 30, 2019

(54) IMAGE PROCESSING SYSTEM, METHOD, AND NON-TRANSITORY COMPUTER READABLE MEDIUM

(71) Applicant: FUJI XEROX CO., LTD., Tokyo (JP)

(72) Inventors: Naoya Nobutani, Yokohama (JP); Masafumi Ono, Yokohama (JP); Manabu Hayashi, Yokohama (JP); Kunitoshi Yamamoto, Yokohama (JP); Toru Suzuki, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/725,585

(22) Filed: Oct. 5, 2017

(65) Prior Publication Data

US 2018/0039464 A1 Feb. 8, 2018

Related U.S. Application Data

(63) Continuation of application No. 15/208,142, filed on Jul. 12, 2016, now Pat. No. 9,811,299.

(30) Foreign Application Priority Data

Mar. 16, 2016 (JP) ................................. 2016-052797

(51) Int. Cl.
*G06F 3/12* (2006.01)
*G06F 3/16* (2006.01)
(Continued)

(52) U.S. Cl.
CPC ............ *G06F 3/1267* (2013.01); *G06F 3/017* (2013.01); *G06F 3/1204* (2013.01);
(Continued)

(58) Field of Classification Search
CPC ..... G06F 3/1267; G06F 3/1238; G06F 3/1222
(Continued)

(56) References Cited

U.S. PATENT DOCUMENTS 9,065,955 B2 6/2015 Baba
2003/0016376 A1 1/2003 Narushima
(Continued)

FOREIGN PATENT DOCUMENTS

EP 0690368 A2 1/1996
EP 0949806 A2 10/1999
(Continued)

OTHER PUBLICATIONS

Feb. 9, 2017 Office Action issued in U.S. Appl. No. 15/208,142.
Jul. 5, 2017 Search Report issued in European Application No. 16182333.1.

*Primary Examiner* — Saeid Ebrahimi Dehkordy
(74) *Attorney, Agent, or Firm* — Oliff PLC (57) ABSTRACT

An image processing system includes a reception unit that receives an image forming instruction from a user, a retaining unit that retains the image forming instruction in association with the user, an acceptance unit that accepts an execution instruction from the user; an authentication unit that performs authentication of the user, and an image forming unit that executes the image forming instruction retained by the retaining unit in association with the authenticated user. The image forming unit executes the image forming instruction without accepting the execution instruction by the acceptance unit in a case where the authentication unit completes the authentication and cancellation of execution by the user is not present within a holding time.

4 Claims, 8 Drawing Sheets

(51) Int. Cl.
*G06F 3/01* (2006.01)
*H04N 1/00* (2006.01)
*H04N 1/44* (2006.01)
*G06F 21/32* (2013.01)
*G06K 9/00* (2006.01)
*H04L 29/06* (2006.01)
*G06F 21/60* (2013.01)

(52) U.S. Cl.
CPC .......... *G06F 3/1222* (2013.01); *G06F 3/1238* (2013.01); *G06F 3/1285* (2013.01); *G06F 3/167* (2013.01); *G06F 21/32* (2013.01); *G06K 9/00221* (2013.01); *H04L 63/0861* (2013.01); *H04N 1/00381* (2013.01); *H04N 1/00395* (2013.01); *H04N 1/00403* (2013.01); *H04N 1/00488* (2013.01); *H04N 1/00925* (2013.01); *H04N 1/442* (2013.01); *H04N 1/444* (2013.01); *H04N 1/4413* (2013.01); *H04N 1/4433* (2013.01); *G06F 21/608* (2013.01); *H04N 2201/0098* (2013.01)

(58) Field of Classification Search
USPC .......................................................... 358/1.14
See application file for complete search history.

(56) References Cited

U.S. PATENT DOCUMENTS

| | | |
|---|---|---|
| 2006/0056666 A1 | 3/2006 | Mizutani et al. |
| 2009/0284790 A1 | 11/2009 | Ohashi |
| 2011/0286028 A1 | 11/2011 | Kinouchi et al. |
| 2014/0036297 A1* | 2/2014 | Arai .................. G06K 15/4095 358/1.14 |
| 2014/0070002 A1 | 3/2014 | Pineau et al. |
| 2014/0104636 A1 | 4/2014 | Baba |
| 2014/0149859 A1 | 5/2014 | Van Dyken et al. |
| 2015/0078613 A1 | 3/2015 | Forutanpour et al. |
| 2015/0103365 A1 | 4/2015 | Baba |
| 2015/0317109 A1 | 11/2015 | Kirihata |
| 2018/0039464 A1* | 2/2018 | Nobutani ................ G06F 21/32 |

FOREIGN PATENT DOCUMENTS

| | | |
|---|---|---|
| EP | 2602691 A1 | 6/2013 |
| JP | 5482956 B1 | 5/2014 |
| JP | 2016018264 A | 2/2016 |

* cited by examiner

IMAGE PROCESSING SYSTEM, METHOD, AND NON-TRANSITORY COMPUTER READABLE MEDIUM

CROSS-REFERENCE TO RELATED APPLICATIONS

This application is a continuation application of U.S. patent application Ser. No. 15/208,142, filed Jul. 12, 2016, which is based on and claims priority under USC 119 from Japanese Patent Application No. 2016-052797, filed on Mar. 16, 2016.

BACKGROUND

Technical Field

The present invention relates to an image processing system, an image processing method, and a non-transitory computer readable medium.

SUMMARY

According to an aspect of the invention, there is provided an image processing system including: a reception unit that receives an image forming instruction from a user; a retaining unit that retains the image forming instruction in association with the user; an acceptance unit that accepts an execution instruction from the user; an authentication unit that performs authentication of the user; and an image forming unit that executes the image forming instruction retained by the retaining unit in association with the authenticated user. The image forming unit executes the image forming instruction without accepting the execution instruction by the acceptance unit in a case where the authentication unit completes the authentication and cancellation of execution by the user is not present within a holding time.

BRIEF DESCRIPTION OF DRAWINGS

Exemplary embodiments of the present invention will be described in detail based on the following figures, wherein.

DETAILED DESCRIPTION

An exemplary embodiment of the invention will be described with reference to the accompanying drawings.

First, a basic principle of the exemplary embodiment will be described.

As described above, a configuration where instructions to form an image such as print instructions are temporarily retained (held) in an image processing system and the instructions to form the image are executed with instructions of a user at the image processing system as a trigger is effective from the viewpoint of improving security. Such systems can prevent the printed material from being seen by a person other than the user or being taken away, which may happen in a case where the systems execute the print instructions on receiving them. However, further operations such as operations on a UI touch panel in the image processing system are needed to be performed by the user. When a user operates an image processing system, authentication of the user is generally required. Eventually, a user that performs an image formation goes through the following operations: (A) instructing to form an image in the image processing system→authenticated in the image processing system→instructing for execution on the UI touch panel of the image processing system.

Accordingly, in the exemplary embodiment, by focusing on authentication in an image processing system and automatically performing an image forming process using completion of the authentication as a trigger, instructions for execution on an UI touch panel are not necessary, and thus the operations by a user is designed to be reduced.

In the exemplary embodiment, a user can perform an image formation through the following operations: (B) instructing to form an image in the image processing system→authenticated in the image processing system.

Various authentication methods such as authentication using an IC card, biometric authentication of a facial image, a fingerprint, a vein, or the like, authentication using a mobile terminal, authentication by inputting a password can be adopted as the authentication in the exemplary embodiment. Here, authentication other than authentication using an UI touch panel is preferable. The authentication can be classified generally into authentication in the vicinity of an image processing system (vicinity authentication) and authentication at a position relatively away from an image processing system (remote authentication).

The vicinity authentication is, for example, authentication performed by passing an IC card over, authentication performed by a fingerprint or a vein, or authentication performed by capturing a face with a camera with the face approaching the predetermined position. The vicinity authentication is authentication in which the intention of the user is reflected. That is, a user that wants to form an image can be assumed to actively pass an IC card over or actively pressing his or her finger or the like against a reading unit to perform authentication.

On the other hand, the remote authentication is, for example, authentication performed by image-capturing with a camera at a remote distance, and it is difficult to say that the intention of the user is always reflected. That is, a person other than the user, the user that has an intention of forming an image, may be present incidentally within a visual field of the camera and the person may be erroneously authenticated in some cases. In a case where a charging process is accompanied with an image forming process such as printing and performed, an erroneous charging process may be performed through an automatic image forming processes in response to completion of authentication. The authentication performed with a camera can be included in either the vicinity authentication or the remote authentication.

The authentication can also be classified into active authentication and passive authentication, generally. The active authentication is, for example, authentication performed by passing an IC card over or authentication performed by a fingerprint or a vein. The active authentication is authentication in which the intention of the user is reflected. The passive authentication is, for example, authentication performed by capturing the user from a remote distance with a camera. In the passive authentication, an erroneous charging process may be performed through an automatic image forming processes in response to completion of authentication, as in the case of the remote authentication. In other words, the active authentication can also be said to be authentication starting using a user's action as a source and the passive authentication can also be said to be authentication starting not using a user's action as a source.

Accordingly, in the exemplary embodiment, when the remote authentication or the passive authentication is performed, image forming is not automatically performed by completion of authentication, but a certain holding time is intervened. When the user expresses the intention to cancellation in the certain holding time, the automatic execution of the image forming is stopped, thereby preventing an erroneous charging process. The indication of intention of cancellation by the user is preferably performed in a manner other than the operation of the UI touch panel, for instance, by body and hand expressions (gestures) for a gesture sensor such as a camera or a voice input to a microphone.

Even when the image forming automatically starts, the execution of the image forming is stopped when the user expresses the intention of cancellation, and thus an erroneous charging process due to erroneous automatic execution is prevented. In this case, the indication of intention to cancellation by the user may be performed by the operation of the UI touch panel as well as gesture or voice similarly to the case of the cancellation within a certain holding time. However, the operability is preferably simple compared to a normal stop operation by the UI touch panel in consideration of the operation after the image forming has started, any key on the UI touch panel functions as a stop key, or the stop key is largely displayed on the UI touch panel compared to that in a normal case to improve visibility.

In this exemplary embodiment, examples of the cancellation of the automatic execution of the image forming include (1) cancellation during the holding time before the automatic execution and (2) cancellation after the start of the automatic execution, but may include a combination thereof.

Hereinafter, with respect to an exemplary embodiment, a case of printing document data or the like as image formation will be described specifically.

Figure 1:
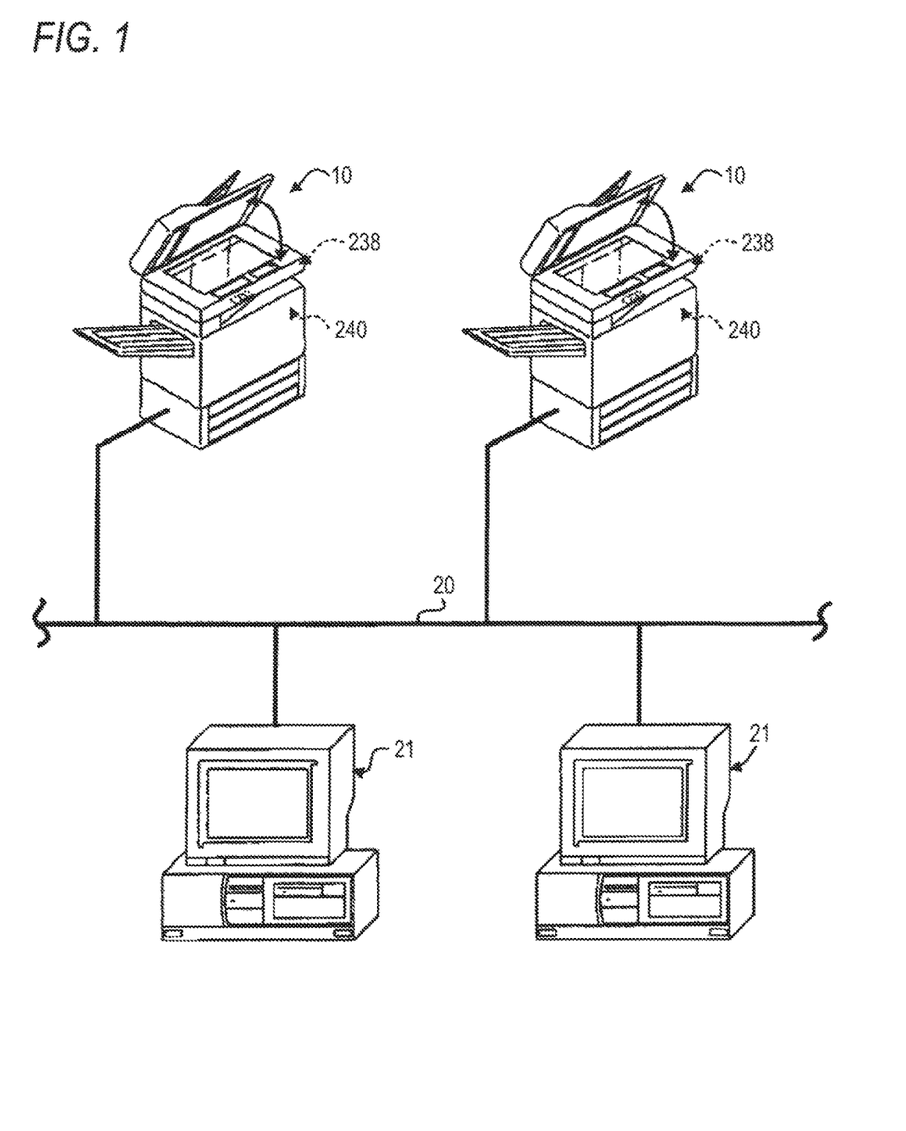
FIG. 1 is a system configuration diagram according to an exemplary embodiment.

FIG. 1 is a system configuration diagram according to an exemplary embodiment.

An image processing system 10 is connected to a network 20 such as an internet. The number of the image processing systems 10 is arbitrary. A personal computer (PC) 21 serving as a terminal is also connected to the network 20. A user remotely outputs image forming (printing) instructions to the image processing system 10 from the PC 21. Apart from this, the user can also output print instructions by various operations in front of the image processing system 10. The feature of the exemplary embodiment is a process in a case where the user outputs the print instructions from the PC 21 via the network 20, so that the description will focus on such process.

The PC 21 is merely an example of the terminal, and may be a smart phone or a tablet terminal. The network 20 may either be in a wired or wireless manner.

The image processing system 10 includes an image forming unit 240 that forms an image on a recording sheet and an image reading unit 238 that reads out a document image. The image processing system may further include a facsimile communication control circuit. The image processing system 10 includes a main controller 200 to control the image forming unit 240, the image reading unit 238, and the facsimile communication control circuit, thereby temporarily storing image data of the document image that is read out by the image reading unit 238 and transmitting the read-out image data to the image forming unit 240 or the facsimile communication control circuit.

The main controller 200 is connected to the network 20 such as the Internet, and the facsimile communication control circuit is connected to a telephone network. The main controller 200 is connected to, for instance, the PC 21 via the network 20, and serves as a unit that receives image data and performs facsimile reception/transmission using the facsimile communication control circuit via the telephone network.

The image reading unit 238 includes a document platen for positioning a document, a scanning drive system that irradiates the document with light so as to scan the image of the document placed on the document platen, and a photoelectric conversion element such as a charge coupled device (CCD) that receives light reflected or transmitted by scanning of the scanning drive system and then converts the received light into an electric signal.

The image forming unit 240 includes a photoconductor. A charging unit, a scanning exposure unit, an image developing unit, a transfer unit, and a cleaning unit are disposed around the photoconductor. The charging unit uniformly charges the photoconductor, the scanning exposure unit performs scanning with light beams based on image data, the image developing unit develops an electrostatic latent image formed through scanning and exposure performed by the scanning exposure unit, the transfer unit transfers the developed image on the photoconductor onto the recording sheet, and the cleaning unit cleans the surface of the photoconductor after the transfer has been finished. A fixing unit is disposed on a transport path of the recording sheet to fix the image that has been transferred to the recording sheet.

Figure 2:
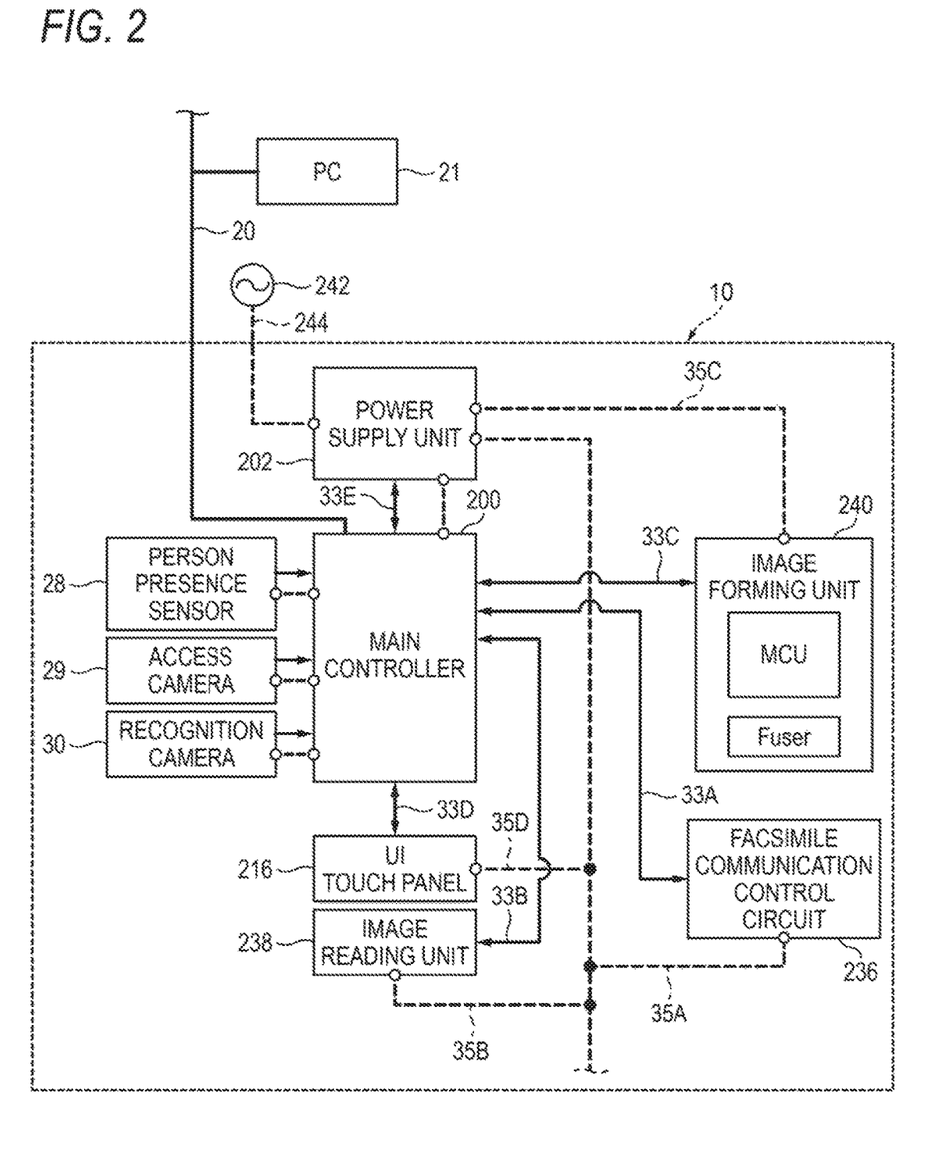
FIG. 2 is a block diagram illustrating a configuration of an image processing system according to an exemplary embodiment.

FIG. 2 is a block diagram illustrating a configuration of the image processing system 10.

The network 20 is connected to the main controller 200. The main controller 200 is connected to the facsimile communication control circuit 236, the image reading unit 238, the image forming unit 240, and an UI touch panel 216 via buses 33A to 33D, such as a data bus or a control bus, respectively. The main controller 200 mainly controls each of the processing units in the image processing system 10.

The image processing system 10 is provided with a power supply unit 202 that is connected to the main controller 200 through a harness 33E. The power supply unit 202 is supplied with power from the commercial power supply 242. The power supply unit 202 is provided with power supply lines 35A to 35D that supply power to the main controller 200, the facsimile communication control circuit 236, the image reading unit 238, the image forming unit 240, and the UI touch panel 216 independently from each other. Thus, the main controller 200 individually performs the supply of power to each of the processing units (devices) or individually interrupts the supply of power.

Plural sensors (a person presence sensor 28, an access camera 29, and a recognition camera 30) are connected to the main controller 200 and monitor whether there is a person in the surrounding area of the image processing system 10.

The person presence sensor 28 detects movement of a moving body such as a user in the surrounding area of the image processing system 10. An instance of the person presence sensor 28 may include an infrared sensor using a pyroelectric effect of a pyroelectric element. The feature of the sensor using the pyroelectric effect of the pyroelectric element is that power consumption is lower and that a detection area is broad, compared to a reflective sensor provided with a light projecting unit and a light receiving unit. Since the person presence sensor 28 detects movement of a moving body, it does not detect presence of a person when the person stays even though the person is in the detection area. When the person presence sensor 28 detects the movement of the moving body, each of the units of the image processing system 10 is supplied with power and is transferred to an operation state from a sleep state.

The access camera 29 detects movement information (including distance information and movement direction information) of the moving body such as a user. The access camera 29 captures images with which at least a transition of a position coordinate of the moving body may be recognized. When the position of the moving body is acquired, if the moving body transmits a signal, radar may also be applicable. For instance, an image sensor (a CCD image sensor or a CMOS image sensor) may be applicable as the access camera 29. As a specification of the access camera 29, it is desirable that the resolution of the access camera 29 be at a level at which the trace of the moving body that is approaching the image processing system 10 is proven and the field of view (image capturing area) of the access camera 29 needs to be broader (or especially has a wider angle) than that of the person presence sensor 28.

The recognition camera 30 detects individual recognition information of a user. In order to detect the individual recognition information of the user, for instance, the recognition camera 30 captures inherent feature information such as a face of the user. The main controller 200 executes authentication by collation and analysis between image information of the characteristics of the face or the like captured by the recognition camera and an image database regarding the characteristics of faces that have been registered in advance. The individual recognition information is used to control the operation of the image processing system 10. An image sensor (a CCD image sensor or a CMOS image sensor) may be applicable as the recognition camera 30. The face recognition is performed using a filter configuration suitable for face recognition (mainly, a filter configuration with which the contour of the face, eyes, a nose, a mouth, and the like are clearly detected). The person presence sensor 28 and the access camera 29 are not necessarily configured as a separate member and may serve as a sensor that performs both person presence detection and access detection. For instance, these sensors may be configured by a two-dimensional infrared array sensor to detect a temperature distribution of area by acquiring a two-dimensional infrared image, detect a human body, and detect movement of the human body in real time.

A target to be captured by the recognition camera 30 is not limited to the face, and a collation may be performed by capturing of a bar code or a QR Code (registered trademark) of an item (an ID card or documents) that the user has or carries. The person presence sensor 28 and the access camera 29 can be attached to a pillar unit on a housing of the image processing system 10, the pillar unit having a longitudinally elongated rectangular shape. The recognition camera 30 may be attached in the vicinity of the UI touch panel. As the access camera 29 and the recognition camera 30, an integrated two-way camera may be used. The recognition camera 30 may be attached to a rear wall or a pole of the image processing system 10 to have a configuration in which the user is captured from the front or a configuration in which the camera is used to authenticate a user around the image processing system and may be used together with a scanner, which captures and incorporates an image, by directing the camera to a downward side. Further, the recognition camera 30 does not necessarily provided in the image processing system 10, and may be a monitoring camera that monitors an area in the vicinity of the image processing system 10 or a network camera that is connected to a network. Alternatively, the recognition camera 30 may be a camera for a mobile terminal carried by a user. The exemplary embodiment of the invention may have a configuration in which a face image obtained by the monitoring camera, the network camera, or the user's mobile terminal is received by a network server, and the network server performs authentication and supplies authentication results to the image processing system 10. In summary, the exemplary embodiment may have a configuration where the image processing system 10 determines, according to the authentication results regarding the user acquired, whether a print job related to the authentication user is present, as will be described below, and executes the print job without receiving execution instruction from the user when the print job is present. Moreover, the authentication results may be acquired by authentication determination in the own device or acquired from another device.

In addition to this configuration, the image processing system 10 may include a speaker that produces a sound of a notification voice or a microphone through which a voice is input from the user, and an interface that establishes communication with the mobile terminal (a smart phone or the like) carried by the user.

Figure 3:
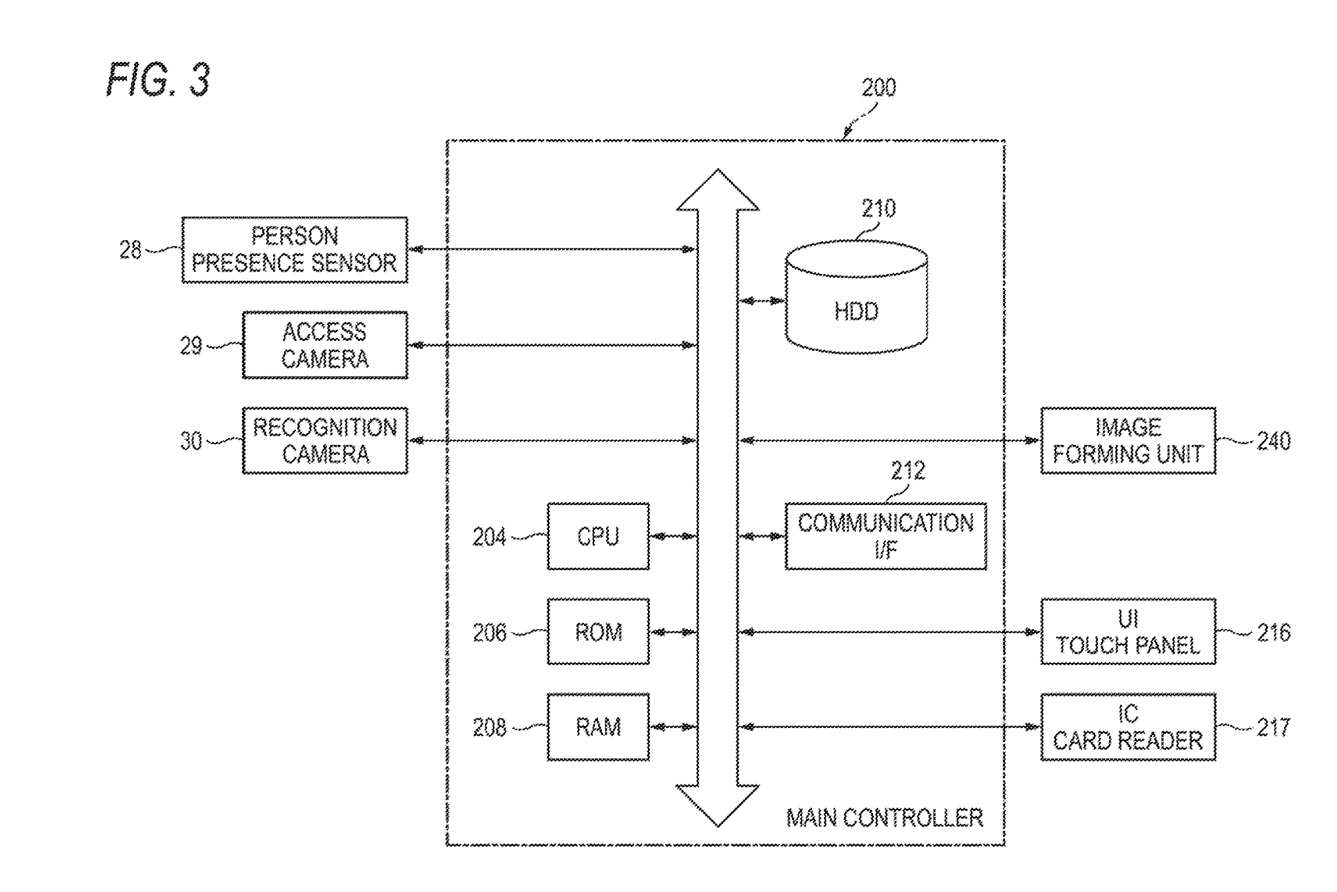
FIG. 3 is a block diagram illustrating a configuration of a main controller according to the exemplary embodiment.

FIG. 3 is a block diagram illustrating a configuration of the main controller 200. The main controller 200 includes a CPU 204, a ROM 206, a RAM 208, an HDD (Hard Disk Drive) 210, a communication interface (I/F) 212, and a bus. The image forming unit 240, the UI touch panel 216, and an IC card reader 217 are connected to the bus. Based on a processing program recorded in the ROM 206 or the hard disk 210, the CPU 204 operates to realize the function of the main controller 200. The program is installed from a non-transitory recording medium (for instance, a CD, a DVD, a BD (Blu-ray Disk), an USB memory, or an SD memory) with the program stored therein, and the CPU 204 may operate based on the installed program to realize the function. The facsimile communication control circuit 236 or the image reading unit 238 are also connected to the bus (see FIG. 2), but the description thereof will not be presented for convenience.

When the user outputs print instructions including document data to the image processing system 10 from the PC 21 at own seat, the main controller 200 receives the print instructions, and once retains (stores) the print instructions in the HDD 210 or the RAM 208 in association with the user instead of immediately executing the print instructions. Thereafter, when the user approaches the image processing system 10 and is authenticated by the recognition camera 30, the retained print instructions of the user are executed by reading them with the completion of authentication as a trigger. At this time, the operation of the UI touch panel 216 is not required, and the main controller 200 prints only with the completion of authentication as a condition to start the printing. Accordingly, the user can output the print instructions from the PC 21 and print a desired document after only the completion of authentication with the image processing system 10, and the operation with the UI touch panel 216 of the image processing system 10 is not required.

In a case where a charging process is executed in conjunction with the execution of the printing, there may be a problem when, for instance, the authenticated user does not want to execute the printing. For instance, there may be a case where the user outputs the print instruction to the multifunction machine from the PC 21, but wants to stop the printing for some reasons. In a case where authentication can be performed even at a position apart from the multifunction machine, a user who does not necessarily desire to print can also be erroneously authenticated. In this case, it is not desirable to automatically execute the printing on completion of the authentication.

Therefore, the main controller 200 does not immediately performed the automatic execution of the printing even when the authentication is completed, gives the user a chance of cancellation of automatic execution by setting a certain holding time, and determines whether the user's intention of cancellation is indicated with the holding time. The automatic execution is stopped when the intention of cancellation is indicated, and the automatic execution starts when the intention of cancellation is not indicated, whereby the inconvenience caused by the automatic execution is prevented.

A certain holding time may be a preset fixed value (for instance, 5 seconds) or may be a fixed value for each the image processing system 10. The image processing system 10 is provided, as described above, with a scanning exposure unit that performs scanning with light beams based on image data, an image developing unit that develops an electrostatic latent image formed through scanning and exposure performed by the scanning exposure unit, a transfer unit that transfers the developed image on the photoconductor onto the recording sheet, a cleaning unit that cleans the surface of the photoconductor after the transfer has been finished, and a fixing unit that is disposed on a transport path of the recording sheet to fix the image, which has been transferred to the recording sheet. Considering the time required for the series of printing steps, the holding time may be set appropriately for each the image processing system 10 according to the time required for the printing steps. For instance, since the fixing unit needs to be warmed to a predetermined temperature prior to starting the printing, a time until a temperature of the fixing unit rises is set as the holding time. Alternatively, the holding time is individually specified by the user and may be set in the image processing system 10. Alternatively, the holding time may be variably set between a lower limit value and an upper limit value. For instance, the holding time may be variably set to be shorter as the distance between the user and the image processing system 10 becomes closer at the time when the authentication is completed. Alternatively, the holding time can be increasingly and decreasingly adjusted for each user by learning of the user's past history.

Figure 4:
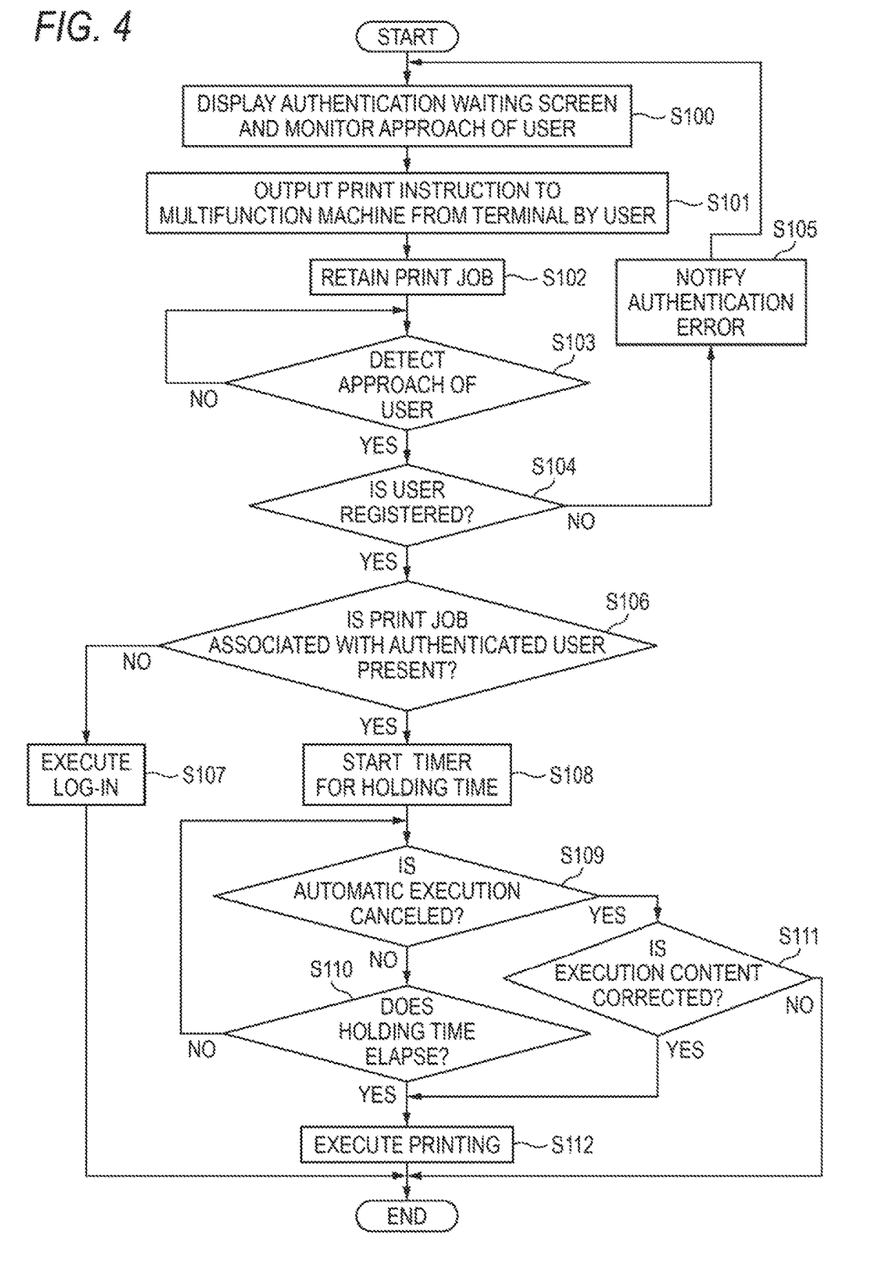
FIG. 4 is a flowchart according to the exemplary embodiment.

FIG. 4 is a flowchart illustrating a process according to the exemplary embodiment. A multifunction machine implemented with a plurality of functions such as printing and scanning is exemplified as the image processing system 10.

In a case where the user does not yet output the print instructions to the image processing system 10, the multifunction machine is in a sleep state when the moving body is not detected by the person presence sensor 28. Power is supplied to the UI touch panel 216 and an authentication waiting screen is displayed on the UI touch panel 216 (S100) when the moving body is detected by the person presence sensor 28. The multifunction machine may indicate predetermined messages on the authentication waiting screen.

Subsequently, when the user operates the PC 21 at own seat and outputs the print instructions to the multifunction machine (S101), the main controller 200 of the multifunction machine receives the print instructions and stores the print job in the HDD 210 or the RAM 208 in association with the user to hold (retain) the print job (S102). Therefore, the print job will not be directly executed at a point of time when the print job is received. For instance, when a user A outputs print instructions of document data "a" at a point of time Ta, the print job A: user A—document data "a"—point of time Ta are stored in association with each other. When print instructions are received from a plurality of users, the main controller 200 classifies and retains these print instructions for each user. For instance, the main controller 200 classifies and retains the print instructions as follows:

print job A: user A—document data "a"—point of time Ta
print job B: user B—document data "b"—point of time Tb
print job C: user C—document data "c"—point of time Tc
print job D: user D—document data "d"—point of time Td.

Next, it is determined whether the access camera 29 detects the approach of the user (S103). Alternatively, the approach of the user may be determined depending on the presence or absence of establishment of a near field communication (Bluetooth or the like) with a mobile terminal (smart phone or the like) of the user, for instance. When the approach of the user is detected, it is determined whether the approaching user is a user registered in advance (S104). This determination is equivalent to the authentication of the user, and may be performed in a manner that a user's face image is captured by the recognition camera 30 and the captured face image collates with face images registered in advance or may be performed in another manner.

When the approaching user does not match the registered user, authentication is regarded as NG, and an authentication error is displayed on the UI touch panel 216 (S105).

When the approaching user matches the registered user, authentication is regarded as OK, and it is determined whether there is a print job associated with the user that is authenticated (S106).

When the print job associated with the authenticated user is not present in print jobs that have been retained, a normal log-in is executed (S107). When there is a print job associated with the user that is authenticated, the main controller 200 starts to operate a timer to count a predetermined holding time (S108). Herein, the holding time is set to a fixed value (for instance, three seconds).

When the holding time elapses, the main controller 200 determines whether the intention of cancellation is indicated by the authenticated user and thus whether the automatic execution is canceled (S109). The main controller 200 may notify the authenticated user of the holding time for the automatic execution. For example, the main controller 200 notifies a message such as "start to operate a process from now. Three, two, one, start" by a voice from a speaker. The countdown of "three, two, and one" corresponds to the holding time. The holding time can be notified by flickering of LED or the like instead of the notification by the voice. There is already known a technique for notifying the time until the signal changes with respect to pedestrians by flickering of LED or the like. When the user is authenticated by establishment of communication with the user's mobile terminal, the main controller may indicate a message such as "Start to operate a process from now. Three, two, one, start" on the mobile terminal.

For instance, the indication of intention of cancellation by the user may include execution stop instructions to be performed by the operation of the user with components provided in the image processing system 10, for instance, a depression of a stop key of a hardware key provided on the image processing system 10 or a stop key of a software key displayed on the UI touch panel. The indication of intention of cancellation by the user may include, for instance, a voice or movement such as a gesture of the user, which is not the operation of the user with the components provided in the image processing system 10 but determined by the image processing system 10 as the execution stop instructions that is accepted as an indication of intention. The indication of intention by the user may be employed in any form. For instance, the intention of cancellation may be indicated by a predetermined gesture, by a predetermined utterance of voice, or by the operation of the stop key on the mobile terminal that is transmitted to the main controller 200. Examples of the predetermined gesture include shaking the user's arms, shaking the user's neck, crossing the user's arms in an X, or gripping a fist. Additionally, a gesture that universally means "stop" in any countries as well as Japan may be used. The predetermined gesture is recognized by the access camera 29 or the recognition camera 30 and is supplied to the main controller 200. The predetermined voice is, for instance, "here it is!", "dangerous!", "standby!", "halt!", "stop!", "cancel!", or "no!". Additionally, a voice that universally means "stop" in any countries as well as Japan may be used. The predetermined voice is input from the microphone and is supplied to the main controller 200. Such an indication of intention represents not an instance of accepting stop instructions with an acceptance unit such as the touch panel provided in the image processing system 10 but an instance of accepting the indication of intention of cancellation by the user at a position apart from the image processing system 10.

The intention of cancellation is required to be indicated by the authenticated user. Therefore, even when a predetermined gesture or a predetermined voice is detected, automatic execution is not stopped by a gesture or voice of a person other than the authenticated user. For this reason, in the case of gesture, for instance, the main controller 200 detects a subject of the gesture at the same time and determines whether the detected subject matches the authenticated user; and in the case of voice, the main controller detects a voiceprint and determines whether the detected voiceprint matches a voiceprint of the authenticated user.

The indication of intention of cancellation by the user may include any action other than the assumed action that a user having the intention to print is typically likely to take. That is, it is typically assumed that the user having the intention to print directly approaches the multifunction machine at a constant walking speed after outputting print instructions using the PC 21. Accordingly, when an action such as unnecessary shaking of hands, unnecessary running, unnecessary utterance, or unnecessary stop is detected, it may be considered that the intention of cancellation is indicated. However, if the automatic execution is stopped every time a trivial action is taken, the significance that user's operations may be reduced by the automatic execution on completion of authentication may diminish, and thus there may be a natural limit.

When determining that the intention of cancellation is not indicated within the holding time and the automatic execution is not canceled, the main controller 200 automatically executes the retained print job (NO in S109, YES in S110, S112).

On the other hand, when the intention of cancellation is indicated within the holding time (YES in S109), it is further determined whether execution contents are corrected (S111). This is provided for a case where the print job is executed, but the number of copies to be printed or colors need to be corrected, and the authenticated user appropriately corrects the execution contents by operating the voice or the UI touch panel 216 and then executes the print job. When the execution contents are not corrected, the print job is canceled without being executed.

Figure 5:
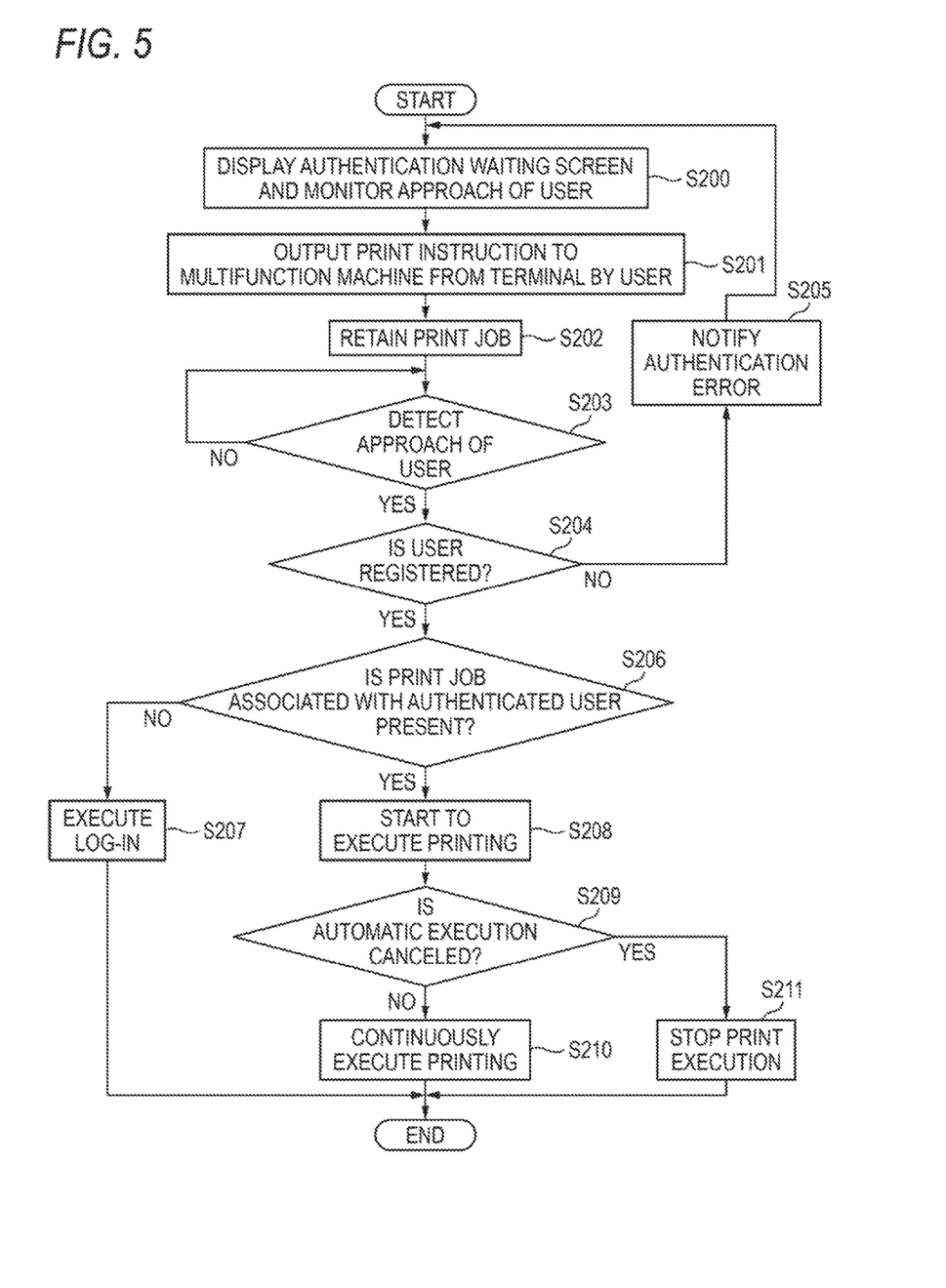
FIG. 5 is a flowchart according to another exemplary embodiment.

FIG. 5 is a flowchart illustrating a process according to another exemplary embodiment where the execution of the print job is started with the completion of authentication as a trigger without providing a holding time, and the automatic execution is stopped by the indication of intention to cancel the automatic execution by the authenticated user after the start of the execution of the print job.

First, the main controller 200 displays an authentication waiting screen on the UI touch panel 216 (S200).

Subsequently, when the user operates the PC 21 at own seat and outputs the print instructions to the multifunction machine (S201), the main controller 200 of the multifunction machine receives the print instructions and stores the print job in the HDD 210 or the RAM 208 in association with the user to retain the print job (S202). Therefore, the print job will not be directly executed at a point of time when the print job is received.

Next, it is determined whether the access camera 29 detects the approach of the user (S203). Alternatively, the approach of the user may be determined depending on the presence or absence of establishment of a near field communication (Bluetooth or the like) with a mobile terminal (smart phone or the like) of the user, for instance. When the approach of the user is detected, it is determined whether the approaching user is a user registered in advance (S204). This determination is equivalent to the authentication of the user, and may be performed in a manner that a user's face image is captured by the recognition camera 30 and the captured face image collates with face images registered in advance or may be performed in another manner.

When the approaching user does not match the registered user, authentication is regarded as NG, and an authentication error is displayed on the UI touch panel 216 (S205).

When the approaching user matches the registered user, authentication is regarded as OK, and it is determined whether there is a print job associated with the user that is authenticated (S206).

When the print job associated with the authenticated user is not present in print jobs that have been retained, a normal log-in is executed (S207). When there is the print job associated with the user that is authenticated, the main controller 200 immediately starts to execute the print job without providing a predetermined holding time (S208).

After the print job starts, the main controller 200 determines whether the intention of cancellation is indicated by the authenticated user and is then determined whether automatic execution is canceled (S209). Prior to the start of the automatic execution, the main controller 200 may notify that the print job is automatically executed. For example, the main controller 200 notifies a message such as "start to operate a process from now" by a voice from a speaker. By flickering of LED or the like instead of the notification by the voice, it is possible to notify that the automatic execution is started. When the user is authenticated by establishment of communication with the user's mobile terminal, the main controller may indicate a message such as "start to operate a process from now".

The indication of intention of cancellation by the user can be employed in any form. For instance, the intention of cancellation is indicated by a predetermined gesture, by predetermined utterance of voice, or by the operation of the stop key on the mobile terminal that is transmitted to the main controller 200.

On the other hand, after the automatic execution of the print job is started, since it is assumed that the authenticated user stands in front of the multifunction machine, the intention of cancellation can be indicated by a stop operation of the UI touch panel 216. However, since there is a user that wants to stop the automatic execution of the print job in confusion, it is preferred that the stop operation on the UI touch panel 216 can be performed in a more simple manner as compared with in a normal operation. Specifically, for instance, any keys on the UI touch pane 1216 may function as stop keys and the automatic execution may be stopped by an operation of any keys. Further, for instance, only the "stop key" may be largely displayed on the UI touch panel 216 without another key being displayed thereon. Further, for instance, all of the operations during a predetermined time period may be regarded as stop instructions and thus the stop instructions may be received in response to every key being pressed. It can be said that the main controller 200 may functionally change the UI touch panel 216 into a stop touch panel when the automatic execution of the print job starts.

The intention of cancellation is required to be indicated by the authenticated user even in this exemplary embodiment. Therefore, even when a predetermined gesture or a predetermined voice is detected, automatic execution is not stopped by a gesture or voice of a person other than the authenticated user. For this reason, in the case of gesture, for instance, the main controller 200 detects a subject of the gesture at the same time and determines whether the detected subject matches the authenticated user; and in the case of voice, the main controller detects a voiceprint and determines whether the detected voiceprint matches a voiceprint of the authenticated user.

When it is determined that the intention of cancellation is not indicated and the automatic execution is not canceled after the start of the automatic execution of the print job, the main controller 200 continuously performs the automatic execution of the print job (NO in S209, S210). When the intention of cancellation is indicated after the start of the automatic execution of the print job (YES in S209), the execution of the print job is stopped (S211).

Figure 6:
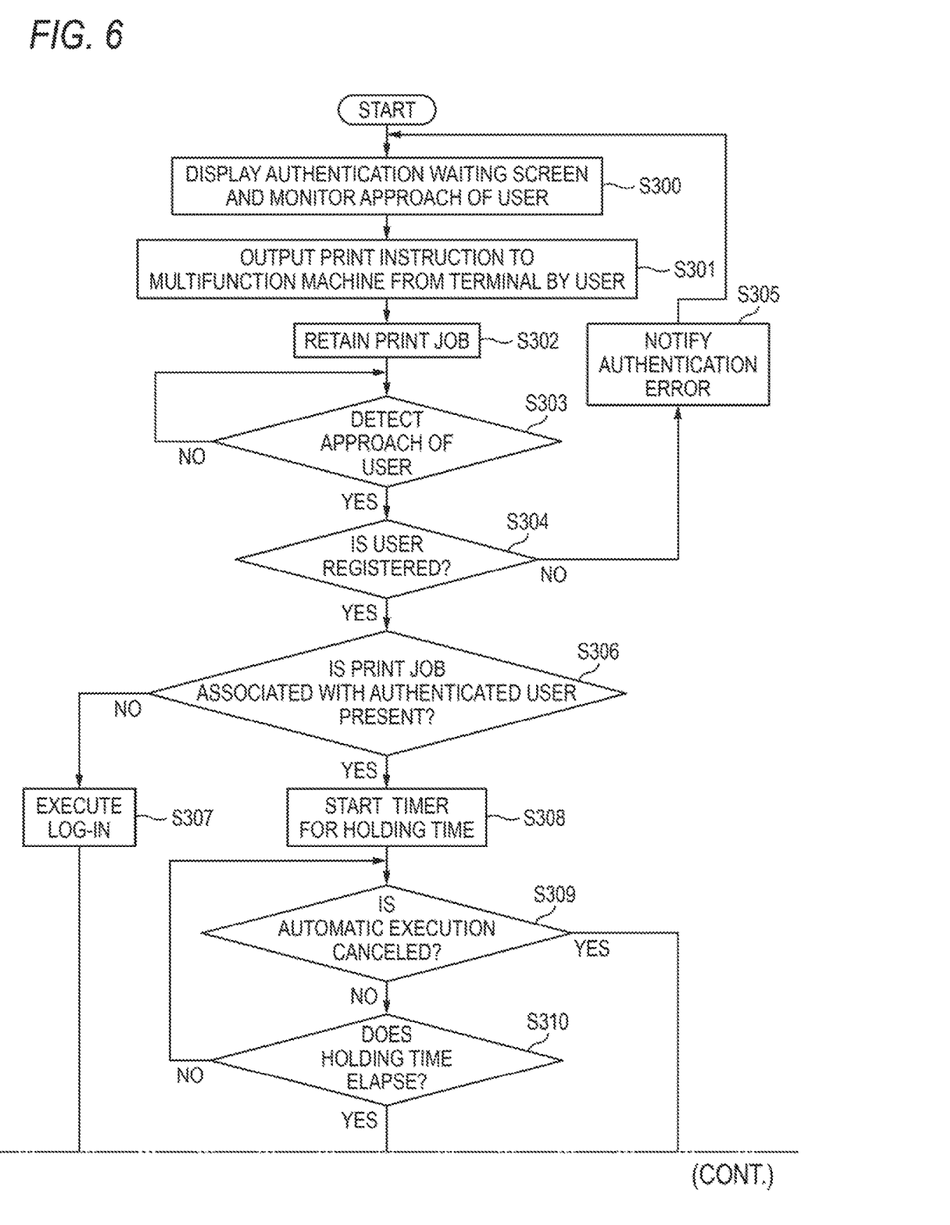
FIG. 6 is a flowchart according to another exemplary embodiment.

FIG. 6 is a flowchart illustrating a process according to further another exemplary embodiment where a certain holding time is provided when the automatic execution of the print job, and the automatic execution is stopped by the indication of intention to cancel the automatic execution by the authenticated user after the start of the print job.

First, the main controller 200 displays an authentication waiting screen on the UI touch panel 216 (S300).

Subsequently, when the user operates the PC 21 at own seat and outputs the print instructions to the multifunction machine (S301), the main controller 200 of the multifunction machine receives the print instructions and stores the print job in the HDD 210 or the RAM 208 in association with the user to retain the print job (S302). Therefore, the print job will not be directly executed at a point of time when the print job is received.

Next, it is determined whether the access camera 29 detects the approach of the user (S303). Alternatively, the approach of the user may be determined depending on the presence or absence of establishment of a near field communication (Bluetooth or the like) with a mobile terminal (smart phone or the like) of the user, for instance. When the approach of the user is detected, it is determined whether the approaching user is a user registered in advance (S304). This determination is equivalent to the authentication of the user, and may be performed in a manner that a user's face image is captured by the recognition camera 30 and the captured face image collates with face images registered in advance or may be performed in another manner.

When the approaching user does not match the registered user, authentication is regarded as NG, and an authentication error is displayed on the UI touch panel 216 (S305).

When the approaching user matches the registered user, authentication is regarded as OK, and it is determined whether there is a print job associated with the user that is authenticated (S306).

When the print job associated with the authenticated user is not present in print jobs that have been retained, a normal log-in is executed (S307). When there is the print job associated with the user that is authenticated, the main controller 200 starts to operate a timer to count a predetermined holding time (S308). Herein, the holding time is set to a fixed value (for instance, three seconds).

When the holding time elapses, the main controller 200 determines whether the intention of cancellation is indicated by the authenticated user and is then determined whether automatic execution is canceled (S309). The main controller 200 may notify the authenticated user of the holding time of the automatic execution. For example, the main controller 200 notifies a message such as "start to operate a process from now. Three, two, one, start." by a voice from a speaker. When the user is authenticated by establishment of communication with the user's mobile terminal, the main controller may indicate a message such as "start to operate a process from now. Three, two, one, start." on the mobile terminal.

The indication of intention to refuse by the user can be employed in any form. For instance, the intention of refusal is indicated by a predetermined gesture, by predetermined utterance of voice, or by the operation of the stop key on the mobile terminal that is transmitted to the main controller 200. The intention of cancellation is required to be indicated by the authenticated user. Therefore, even when a predetermined gesture or a predetermined voice is detected, automatic execution is not stopped by a gesture or voice of a person other than the authenticated user. For this reason, in the case of gesture, for instance, the main controller 200 detects a subject of the gesture at the same time and determines whether the detected subject matches the authenticated user; and in the case of voice, the main controller detects a voiceprint and determines whether the detected voiceprint matches a voiceprint of the authenticated user.

When determining that the intention of cancellation is not indicated within the holding time and the automatic execution is not canceled, the main controller 200 automatically executes the retained print job (NO in S309, YES in S310, S311). When the intention of cancellation is indicated within the holding time (YES in S309), it is further determined whether execution contents are corrected (S314).

After the print job starts, the main controller 200 further determines whether the intention of cancellation is indicated by the authenticated user and is then determined whether automatic execution is canceled (S312).

The indication of intention of cancellation by the user can be employed in any form similarly to the case of S309. For instance, the intention of cancellation is indicated by a predetermined gesture, by predetermined utterance of voice, or by the operation of the stop key on the mobile terminal that is transmitted to the main controller 200. On the other hand, after the automatic execution of the print job is started, since it is assumed that the authenticated user stands in front of the multifunction machine, the intention of cancellation can be indicated by a stop operation of the UI touch panel 216. However, it is preferred that the stop operation on the UI touch panel 216 can be performed in a more simple manner as compared with in a normal operation. For instance, any keys on the UI touch pane 1216 may function as stop keys and the automatic execution may be stopped in response to any keys being operated. Alternatively, only the "stop key" may be largely displayed on the UI touch panel 216 without another key being displayed thereon.

When it is determined that the intention of cancellation is not indicated and the automatic execution is not canceled after the start of the automatic execution of the print job, the main controller 200 continuously performs the automatic execution of the print job (NO in S312, S313). When the intention of cancellation is indicated after the start of the automatic execution of the print job (YES in S312), the execution of the print job is stopped (S314).

Figure 7:
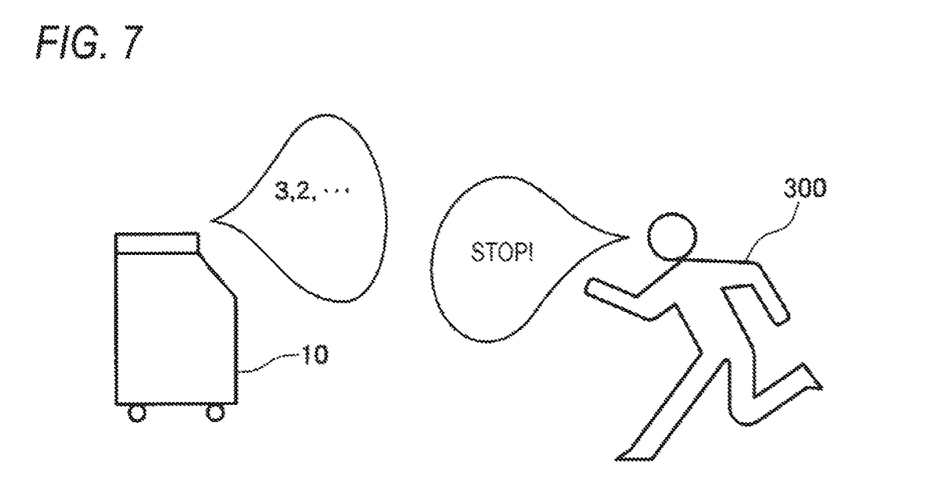
FIG. 7 is an explanatory diagram illustrating a stop of automatic execution according to another exemplary embodiment.

FIG. 7 schematically illustrates a case where the multifunction machine serving as the image processing system 10 in this exemplary embodiment sets a holding time by completion of user's authentication and an authenticated user 300 stops the automatic execution of the print job during the holding time.

The multifunction machine completes the authentication of the user 300 at a position apart from the multifunction machine with the access camera 29 or the recognition camera 30, and starts a timer for holding time. The main controller 200 of the multifunction machine outputs a voice such as "start to operate a process from now. three, two, . . . " to notify the user 300 of the holding time.

In contrast, although outputting the print instructions to the multifunction machine from the PC 21, when the user 300 does not have the intention to print at the moment, for instance, has the intention to use the multifunction machine to scan a particular document, a voice of "stop!" is uttered. The voice of "stop!" from the user 300 is input from the microphone and is then supplied to the main controller 200. The main controller 200 collates a voiceprint of the input voice with a voiceprint registered in advance. At this time, when the voiceprint of the input voice matches the voiceprint of the authenticated use 300, the main controller determines that the intention of cancellation is indicated within the holding time and stops the automatic execution of the print job of the user 300.

When it is difficult to collate using the voiceprint, an image captured by the access camera 29 or the recognition camera 30 may be subsidiary used. That is, when any utterance of the user 300 is detected from a face image of the user 300, the main controller 200 considers that the detected utterance is an utterance by the authenticated user 300.

When the automatic execution of the print job is stopped, since the authentication of the user 300 has already been completed, the operation may proceed to a normal log-in process along with the stop of the automatic execution of the print job.

Figure 8A:
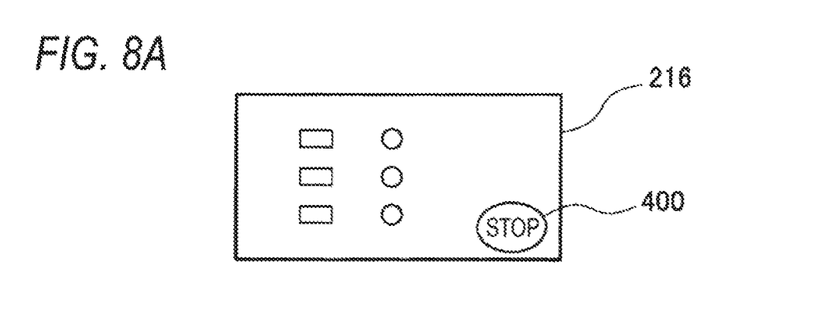
FIGS. 8A and 8B are explanatory diagrams illustrating a display of an UI touch panel according to another exemplary embodiment.
Figure 8B:
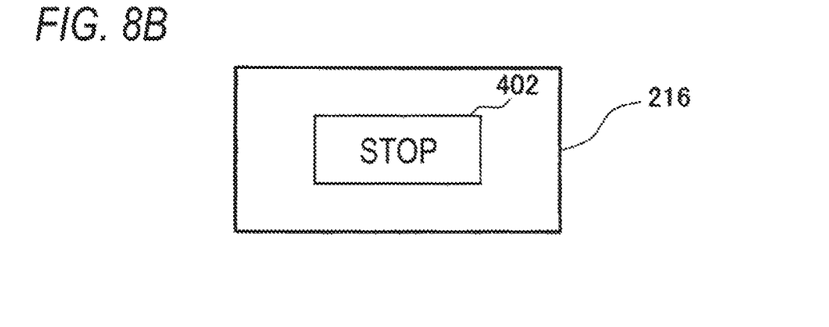

FIGS. 8A and 8B are diagram illustrating schematically a display form of the UI touch panel 216 after the start of the automatic execution of the print job.

FIG. 8A is a schematic diagram of the UI touch panel 216 in a typical case, that is, in a case where the print job is not automatically executed. Along with various keys, a stop key 400 for stopping the process is displayed in a predetermined size at a predetermined position.

FIG. 8B is a schematic diagram of the UI touch panel 216 after the automatic execution of the print job is started. A stop key 402 is largely displayed on the panel, and other keys are not displayed. Even after the print job is automatically executed, since the stop key 402 is largely displayed as illustrated in FIG. 8B, the authenticated user 300 can easily and quickly operate the stop key 402 and stop the execution of the print job. The stop key 402 can be displayed to be larger than the normal stop key 400, to be changed to a color that stands out compared to the stop key 400, and to be flickered prominently compared to the stop key 400. Only the stop key 402 is displayed except a status, and a key other than the stop key 402 can grayed out. In short, the stop key 402 may be relatively highlighted.

As described above, the exemplary embodiment of the invention has been described, but the invention is not limited thereto and may be variously modified.

For instance, in a case where print jobs of plural users are retained in the multifunction machine, when executing the print job associated with the user that was authenticated, the user whose print job is being suspended may be notified. For instance, "start to operate a process of a person A. Three, two, one, start". Thus, it is clear that the user A is a subject of the automatic execution of the print job, and thus it is possible to specifically notify the user A and to prevent the indication of intention of cancellation by a person other than the user A (indication of intention by misunderstanding) in advance.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

The description of embodiments may disclose the following matters.

[1] An image processing system includes:

a reception unit that receives an image forming instruction from a user;

a retaining unit that retains the image forming instruction in association with the user;

an acceptance unit that accepts an execution instruction from the user;

an authentication unit that performs authentication of the user; and an image forming unit that, in a case where the authentication unit completes the authentication, executes the image forming instruction retained by the retaining unit in association with the authenticated user without accepting the execution instruction by the acceptance unit, the image forming unit stopping executing the image forming instruction being executed in response to cancellation of execution by the user.

[2] An image processing system includes:
a reception unit that receives an image forming instruction from a user;
a retaining unit that retains the image forming instruction in association with the user;
an acceptance unit that accepts an execution instruction from the user;
an authentication unit that performs authentication of the user; and
an image forming unit that, in a case where the authentication unit completes the authentication and first cancellation of execution by the user is not present within a holding time, executes the image forming instruction retained by the retaining unit in association with the authenticated user without accepting the execution instruction by the acceptance unit, the image forming unit stopping executing the image forming instruction being executed in response to second cancellation of execution by the user.

[3] In the image processing system according to [1], the cancellation of execution by the user may be at least one of an instruction from a mobile terminal of the user, a predetermined gesture of the user, a predetermined utterance of the user, and a stop operation of the user with the acceptance unit.

[4] In the image processing system according to [2], the first cancellation of execution by the user may be at least one of an instruction from a mobile terminal of the user, a predetermined gesture of the user, and a predetermined utterance of the user, and the second cancellation of execution by the user may be at least one of an instruction from a mobile terminal of the user, a predetermined gesture of the user, a predetermined utterance of the user, and a stop operation of the user with the acceptance unit.

[5] In the image processing system according to [3] or [4], the stop operation of the user with the acceptance unit may be an operation of a stop key that is relatively highlighted.

[6] The image processing system according to [1] or [2] may further include a notification unit that notifies the user of the holding time.

[7] In the image processing system according to [6], the notification unit may notify for which user the holding time is given in a case where the retaining unit retains image forming instructions of a plurality of users.

[8] The image processing system according to [1] or [2] may further include a second acceptance unit that remotely accepts the cancellation of execution by the user.

What is claimed is:

1. An image processing apparatus comprising;
a memory that retains an image forming instruction from a user;
a processor that authenticates the user; and
an image forming unit that automatically executes the image forming instruction of the authenticated user without accepting an execution instruction by the user unless cancellation of the image forming instruction is presented during a holding time which starts from when an authentication of the user is completed.

2. The image processing apparatus according to claim 1, wherein
the processor operates a timer that counts the holding time.

3. The image processing apparatus according to claim 1, wherein
the processor notifies the user of the holding time.

4. The image processing apparatus according to claim 3, wherein
the processor notifies remaining time of the holding time by countdown.

* * * * *